May 4, 1965 R. M. HOWE 3,182,303

ANALOG TO DIGITAL CONVERSION

Filed Oct. 31, 1960 2 Sheets-Sheet 1

INVENTOR.
ROBERT M. HOWE

BY Edward A. Robinson
attorney

INVENTOR.
ROBERT M. HOWE
BY Edward A. Robinson
Attorney

United States Patent Office 3,182,303
Patented May 4, 1965

3,182,303
ANALOG TO DIGITAL CONVERSION
Robert M. Howe, Ann Arbor, Mich., assignor to General Precision, Inc., Binghamton, N.Y., a corporation of Delaware
Filed Oct. 31, 1960, Ser. No. 66,077
2 Claims. (Cl. 340—347)

This invention relates to analog and digital electronic computing systems, and more particularly to circuits for converting analog signals representative of numerical quantities into digitally coded signals representative of the same numerical quantities.

Electronic computers may be generally classified into two basic types—analog and digital. In analog computing circuits, certain electrical quantities, usually voltages, correspond in value to numerical quantities which are represented thereby. In digital computer circuits, various numerical quantities are represented by coded combinations of signals. The binary code is a common digital code for computing circuits whereby signals will exist in either of two definite states representative of the binary numbers "0" and "1." The circuits of analog and digital computers are quite different from each other, but it is often necessary to convert analog signals into corresponding digital signals, or vice versa; and various circuits have been devised for analog-to-digital or digital-to-analog signal conversion.

An electronic computing system may develop a plurality of analog signals each of which must be converted into digital numbers. Such a computer could employ several analog to digital converting circuits, but it may be more economical to provide a single converting circuit which is multiplexed to the various analog signals. One such arrangement may provide for time sharing of the various analog inputs which are applied sequentially to single converter circuit by a switching or commutator arrangement. The various analog signals may be sequentially applied to the input or summing point of an operational amplifier and compared with digitally derived voltages to establish a pre-determined signal level in the amplifier. The various digital voltages may be supplied to the input of the amplifier in a descending order of magnitude, allowing an interval of time for comparison with the analog input voltage and thence either accepting or rejecting the digital voltage as a result of the comparison. A plurality of flip-flops may constitute a digital register, and each flip-flop will be selectively reset in response to the comparisons between the analog input signal and the respective digital voltage. A digital output signal may be established in the register resulting from those voltages which were accepted upon comparison with the analog input voltage.

An object of this invention is to provide an improved method and means for analog to digital conversion of signals wherein the speed of operation is increased to correspond to the response time of the operational amplifier or like circuitry in the analog to digital conversion system.

A further object of this invention is to provide an improved analog to digital conversion circuit wherein a binary timing is provided for the comparison time intervals for the various binary voltages whereby the voltage trials representative of the more significant orders of digits are allocated correspondingly more time than the time allocated for the lesser significant orders of digits.

Other objects and many attendant advantages of this invention may be readily appreciated and better understood by reference to the following detailed description to be considered with the accompanying drawings in which.

Figure 1:
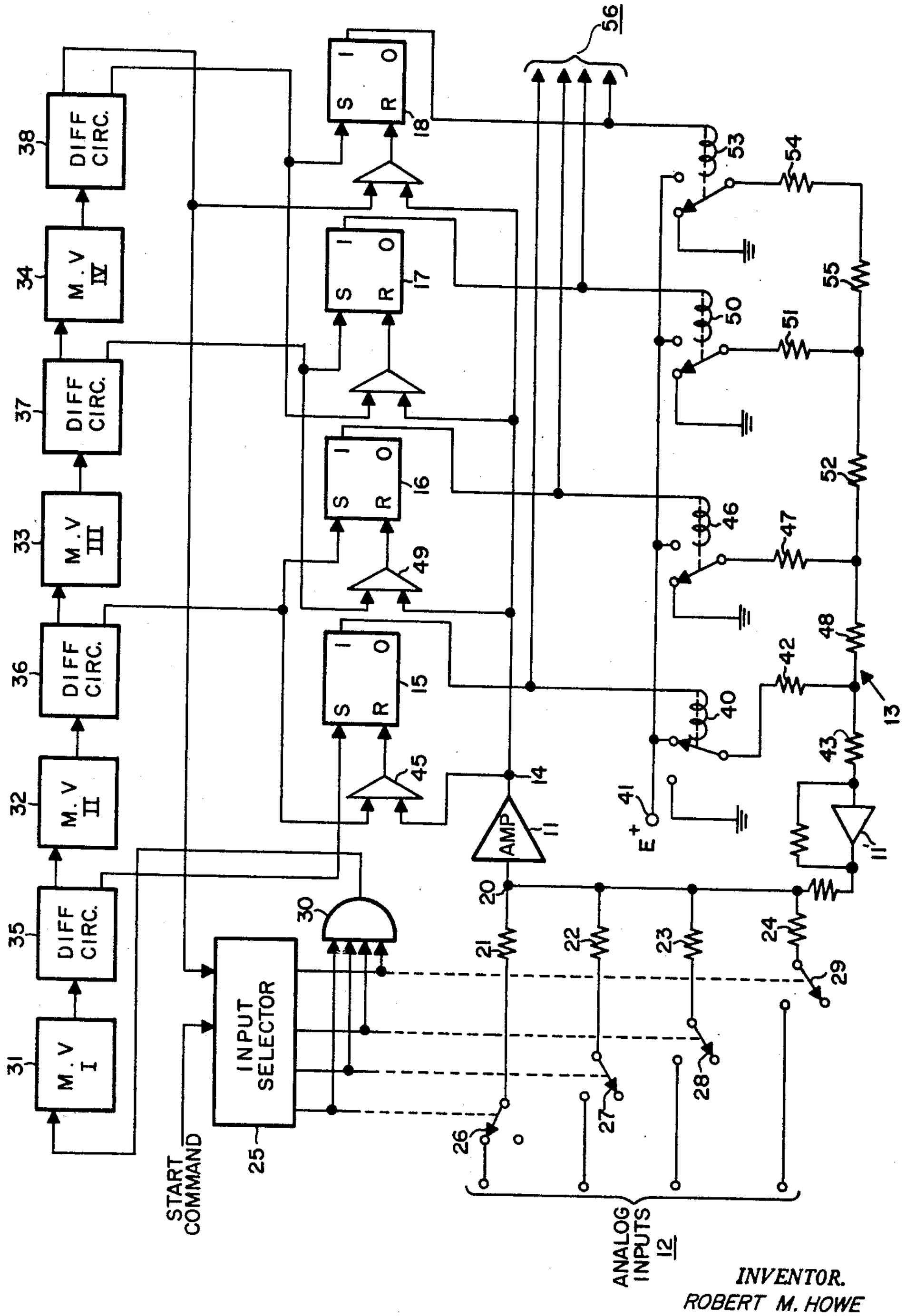
FIGURE 1 is a schematic diagram of an analog to digital signal conversion system using the teachings of this invention.

According to this invention, an amplifier 11 is coupled to receive signals from input terminals 12, and further coupled to receive digitally derived voltages from a ladder circuit 13. The analog input signals and the digitally derived signals from the circuit 13 are of opposite polarities, and when compared by the amplifier 11, positive or negative voltages are developed at the amplifier output point 14 indicating whether the analog input is greater than the digitally derived signal, or vice versa. With each test trial or comparison of the digital voltages, one of several flip-flops or bistable multivibrators 15, 16, 17 or 18 will be selectively reset to provide a digital indication of the digitally derived voltage from the ladder circuit 13 which approximately equals the analog input voltage. The digitally derived voltages are passed by an operational amplifier 11' and are applied to the amplifier 11 in a descending order such that the first voltage may be of a half scale output value, the second voltage may be of a quarter scale value, the third voltage of an eighth scale value, etc. The operational amplifier 11' may have a response time characteristic which is substantially linear or which may be exponential, and therefore, the trial test times for the various digital voltages may be allocated in accordance with the value of the various voltages.

FIGURE 1 shows a particular embodiment of this invention wherein timing pulses are generated by a train of monostable or "single-shot" multivibrators such that various pulse duration times may be established according to the needs of the operational amplifier 11' and other circuitry. If this invention were used in a large computer, the multivibrator train would be unnecessary since timing pulses could be obtained from other apparatus existing in the computer. For example, a computer may use a magnetic drum storage means, and the timing pulses may be generated from a "clock track" recorded on the drum.

For ease of understanding this invention, the circuit of FIGURE 1 is simplified to include only four analog input terminals and only four digital output terminals. Obviously, this circuit could be expanded to include further analog inputs and digital outputs together with the necessary attending circuitry without departing from this invention.

FIGURE 1 indicates the use of various well-known component circuits (AND gates, OR gates, monostable multivibrators, bistable multivibrators or flip-flops and differental circuits) which are shown as simple blocks. The AND gates and OR gates may be of the type shown in FIGURE 2–1, page 38, of R. K. Richard's book entitled "Digital Computer Components and Circuits," published by D. Van Nostrand Company. The monostable multivibrator may be of the type shown by FIGURE 4–15(*f*) on page 169 of the Richard's book supra, and the flip-flop circuits may be of the type shown by FIGURE 4–12, page 161 thereof. The differential circuits may comprise resistive-capacitive networks, or alternatively the differential circuit may be included in the input arrangements of the monostable and bistable multivibrator. The ladder circuit 13 may be of the type shown and described in a copending patent application entitled "Analog-to-Digital Signal Conversion," Serial No. 14,874 filed March 14, 1960, by Gerard Currie and assigned to the same assignee as the present invention.

Referring to FIGURE 1 in greater detail, analog signals from the input terminals 12 are selectively applied to a summing junction 20 of the amplifier 11 through summing resistors 21, 22, 23 and 24. An input selector device 25 may be a commutator with switches 26, 27, 28 and 29 associated therewith, or an arrangement using transistors for selective gating of inputs as is shown in the co-pending patent application, Serial No. 14,874, supra. In FIGURE 1, a single switch 26 is closed such that a first analog signal from the uppermost terminal 12 is applied through the resistor 21 to the summing junction 20 of the amplifier, while the remaining switches 27, 28 and 29 are open thereby isolating the amplifier 11 from the remaining input signals.

When each successive analog switch 26 through 29 is closed a voltage may be passed through an OR gate 30 to the timing arrangement including the chain of monostable or single-shot multivibrators 31, 32, 33 and 34. Each monostable multivibrator will provide a time interval of a selected duration to establish a trial period for each of the digitally derived voltages. Each successive single-shot circuit will be triggered by the termination of the preceding pulse or duration time, and therefore, differentiating circuits 35, 36, 37 and 38 are indicated in FIGURE 1 as a coupling means between the various monostable multivibrators of the chain. No separate differentiating circuit need be employed if the monostable multivibrators are such as to be triggered directly by the trailing edge of the preceding multivibrator pulse.

Figure 2:
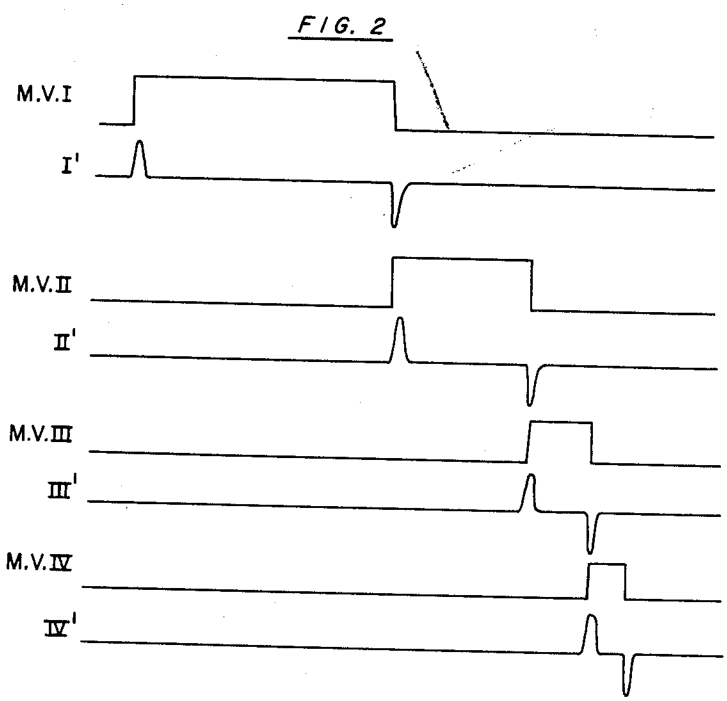
FIGURE 2 is a timing chart showing the relationship of the multivibrator pulses which control the digital voltage trials of this invention.
Figure 3A:
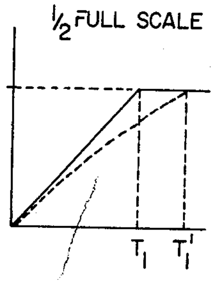
FIGURES 3(*a*), 3(*b*), 3(*c*) and 3(*d*) illustrate response characteristics of a typical operational amplifier and the time intervals required for such an amplifier to respond to step voltage changes of varying magnitudes.
Figure 3B:
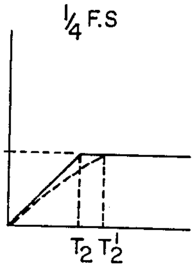
Figure 3C:
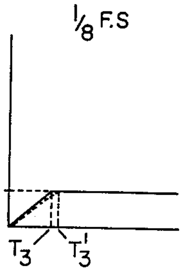
Figure 3D:
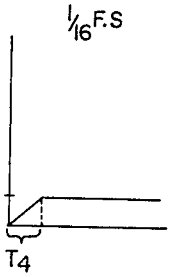

As shown in FIGURE 2, the first monostable multivibrator 31 provides pulses having a duration of approximately ½ of the total digital test cycle time and indicated by the curve MV–I. The output of the multivibrator 31 is differentiated by the circuit 35 to produce the timing pulses $I_1'$ shown by the second curve of FIGURE 2. It may be seen that the differential curve $I_1'$ will have positive voltage spikes when the multivibrator 31 is turned "on" at the beginning of the MV–I pulse and will have negative going spikes at the conclusion of the MV–I pulse. The second multivibrator 32 may be triggered by the negative spikes from the circuit 35 and will produce a pulse MV–II having a duration time of approximately ½ that of the first pulse or ¼ of the test cycle time. Similarly, the pulse MV–II is differentiated by the circuit 36 to produce the positive and negative spikes II'. The subsequent curves of FIGURE 2, MV–III, III', MV–IV and IV' are generated by the subsequent monostable multivibrators 33 and 34 and by the differentiating circuits 37 and 38. As may be noted each successive pulse duration time of the multivibrators 31, 32, 33 and 34 is of shorter duration than the preceding pulse and the duration times may be binary in character to correspond with the digital voltages developed by the ladder circuit 13 and the corresponding amplifier response times.

While the negative spikes from the differentiating circuit derived from the trailing edge of the multivibrator pulses are used to initiate the next successive pulse, it will be appreciated that the positive spikes generated from the leading of the pulses may be passed to the flip-flops or trigger circuits 15, 16, 17 and 18. The flip-flop circuit 15 will be set or turned "on" at the beginning of the pulse MV–I. Subsequently, the flip-flop circuits, 16, 17 and then 18 will be set or turned on in succession by the subsequent pulses MV–II, MV–III and MV–IV respectively.

During the initial pulse time MV–I, the flip-flop circuit 15 is set and a relay switch 40 is energized and closed such that a voltage will be passed from a terminal 41 through a coupling resistor 42, a further resistor 43 and the operational amplifier 11' to the summing junction 20 of the amplifier 11. Thus, the ladder circuit 13 will generate a digital voltage substantially equal to ½ of the full scale value of the analog input signals. The digital voltage from the circuit 42–43 is subtracted from the analog input signal, and the amplifier output at the point 14 will be positive or negative depending upon the relative values of the digitally derived signal and analog signal. In the event that the analog signal exceeds the first digitally derived signal, the voltage at the point 14 may be considered negative in polarity such that an AND gate 45 will not be conditioned to pass a pulse II' from the circuit 36, and therfore, the flip-flop circuit 15 will not be reset and the relay 40 will continue to hold during subsequent digital trials. On the other hand, if the analog input signal exceeds the first digitally derived signal the voltage at the point 14 will be positive, thereby conditioning the AND gate 45 to pass the positive pulse II' and to cause the flip-flop circuit 15 to be reset. Resetting the flip-flop circuit 15 causes the first digital voltage to be rejected since the relay 40 will open during the subsequent digital trials.

In a similar manner the flip-flop circuit 16 will be set by the II' pulse to apply a second order binary voltage by closure of a relay 46 coupling the voltage from the terminal 41 to the summing point 20 through the further resistors 47 and 48. At the conclusion of the MV–II pulse, the circuit 37 will produce a pulse III' and will reset the flip-flop circuit 16 providing the analog input voltage exceeds the digitally derived voltage such that an AND circuit 49 is conditioned to pass the pulse.

In a similar manner the flip-flop 17 is turned on by a pulse III' and will be selectively turned off by a pulse IV' providing the digital voltage is to be rejected. The third order digital voltage will be generated when the flip-flop 17 is turned on, a relay 50 is closed and the voltage from the terminal 41 is passed via resistors 51 and 52 of the ladder network 13. The fourth flip-flop 18 will generate a fourth order digital voltage by closure of a relay 53 coupling the voltage from the terminal 41 to the amplifier summing point 20 via the additional resistors 54 and 55.

During the trial cycle, subsequent digital voltages from the ladder network 13 are compared with the analog input, and either rejected or accepted as a result of the comparison by selectively resetting or failing to reset each successive flip-flop to establish a digitally derived voltage which most nearly compares to the analog input. The final states of the flip-flop circuit 15, 16, 17 and 18 provide a binary coded signal at digital output terminals 56.

This invention provides that the pulse duration times established by the monostable multivibrators 31, 32, 33 and 34 will take into account the time required by the operational amplifier 11' to respond to a step voltage equal to the digital steps provided by the ladder network. Since the ladder network 13 is binary in character, the time allocated for the various digital voltage comparisons may likewise be substantially binary in character. Thus, this invention will minimize the analog to digital conversion time by providing the amplifiers 11 and 11' with the exact time intervals necessary for the various trials without allowing any unnecessarily long time intervals for the lower order voltage steps.

FIGURES 3(*a*), 3(*b*), 3(*c*) and 3(*d*) indicate in solid lines, the response characteristics of an ideal operational amplifier, and should a linearily responsive amplifier be available, the binary related time intervals $T_1$, $T_2$, $T_3$ and $T_4$ would be sufficient for the amplifier response. However, it must be appreciated that actual amplifiers may have response characteristics which are somewhat exponential as shown by the dashed lines of FIGURES 3(*a*) through 3(*d*). In such cases, the pulse duration times of the monostable multvibrators 31 through 34 may be adjusted to provide time intervals $T_1'$, $T_2'$, $T_3'$ and $T_4'$ which are modified from the true binary values, but which correspond with the response characteristics of the actual amplifier. It may be further noted that the non-ideal amplifier curves have their greatest departure from the ideal curves for the greater time intervals. Indeed, no modification from the idealized time intervals need be provided for the lesser significant orders of digits. Obviously, the time intervals for the larger binary steps must be accurately allocated to assure a minimum conversion time, however, for simplicity of design the time intervals for the lesser significant voltages or digits may be uniform in duration.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for converting analog signals representative of numerical quantities into digital signals corresponding to the numerical quantities, said apparatus comprising an amplifier having an input circuit and an output circuit, a digital circuit operable to generate binary voltages sequentially in a descending order of value, the input circuit of the amplifier being coupled to receive both the analog signals and the binary voltages, said amplifier being operable to compare the analog signals with the binary voltages and to provide a voltage at the output circuit thereof in accordance with the comparisons, and a timing means coupled to the digital circuit and operable to generate a conversion cycle wherein each digital circuit is operative for a duration of time corresponding to a time required by the amplifier to respond to each descending order of binary voltages, the timing means being operable to generate a first control pulse having a duration time of substantially one half of the conversion cycle whereby the binary voltage having the greatest order of value will have a comparison time of substantially half of the conversion cycle, the timing means being further operable to generate a second control pulse having a duration time of substantially one quarter of the conversion cycle, and the timing means being further operable to generate subsequent control pulses having duration times substantially less than the duration time of the second amplifier control pulse.

2. Apparatus for converting analog signals representative of numerical quantities into binary coded signals corresponding to the numerical quantities, said apparatus comprising an amplifier having an input circuit and an output circuit, digital circuits operable to generate binary voltages sequentially in a descending order of value, the input circuit of the amplifier being coupled to receive both the analog signals and the binary voltages, said amplifier being operable to compare the analog signals with the binary voltages and to provide a voltage at the output circuit thereof in accordance with the comparisons, and a train of monostable multivibrator circuits operable to generate a test cycle including a sequence of pulses having different duration times, said train of monostable multivibrator circuits being controllably coupled to the digital circuits to render each digital circuit operative for a duration of time corresponding to the time required by the amplifier to respond to each descending order of binary voltages the first monostable multivibrator circuit being operable to generate a pulse having a duration time of substantially one half of the test cycle, the second monostable multivibrator circuit being operable to generate a pulse having a duration time of substantially one quarter of the test cycle, and the remaining monostable multivibrator circuits of the train being operable to generate pulses having duration times substantially less than the pulse duration times of the second monostable multivibrator circuit.

References Cited by the Examiner

UNITED STATES PATENTS

| | | | |
|---|---|---|---|
| 2,715,678 | 8/55 | Barney | 340—347 |
| 2,819,054 | 1/58 | Thorsson | 340—347 |
| 2,970,309 | 1/61 | Towles | 340—347 |
| 3,100,298 | 8/63 | Fluhr | 340—347 |

MALCOLM A. MORRISON, *Primary Examiner.*

IRVING L. SRAGOW, *Examiner.*